United States Patent
Fitzgerald et al.

(10) Patent No.: US 9,112,769 B1
(45) Date of Patent: Aug. 18, 2015

(54) PROGRAMATICALLY PROVISIONING VIRTUAL NETWORKS

(75) Inventors: Joseph E. Fitzgerald, Seattle, WA (US); Benjamin W. Mercier, Issaquah, WA (US); Eric Jason Brandwine, Haymarket, VA (US); Marvin M. Theimer, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 962 days.

(21) Appl. No.: 12/978,995

(22) Filed: Dec. 27, 2010

(51) Int. Cl.
G06F 15/173 (2006.01)
H04L 12/24 (2006.01)
H04L 29/08 (2006.01)
H04L 29/06 (2006.01)

(52) U.S. Cl.
CPC ............ *H04L 41/0213* (2013.01); *H04L 29/06* (2013.01); *H04L 29/08072* (2013.01)

(58) Field of Classification Search
USPC ....................................... 709/220, 223; 718/1
See application file for complete search history.

(56) References Cited

U.S. PATENT DOCUMENTS

| | | | | |
|---|---|---|---|---|
| 5,729,710 A * | 3/1998 | Magee et al. | ................. | 711/203 |
| 6,009,469 A * | 12/1999 | Mattaway et al. | ............ | 709/227 |
| 6,131,121 A * | 10/2000 | Mattaway et al. | ............ | 709/227 |
| 6,185,184 B1 * | 2/2001 | Mattaway et al. | ............ | 370/230 |
| 6,230,118 B1 * | 5/2001 | Bader et al. | ..................... | 703/24 |
| 6,317,775 B1 * | 11/2001 | Coile et al. | .................... | 709/201 |
| 6,363,411 B1 * | 3/2002 | Dugan et al. | ................. | 709/202 |
| 6,549,516 B1 * | 4/2003 | Albert et al. | .................. | 370/236 |
| 6,704,873 B1 * | 3/2004 | Underwood | .................... | 726/12 |
| 6,779,030 B1 * | 8/2004 | Dugan et al. | .................. | 709/223 |
| 7,209,964 B2 * | 4/2007 | Dugan et al. | .................. | 709/223 |
| 7,213,047 B2 * | 5/2007 | Yeager et al. | .................. | 709/202 |
| 7,395,536 B2 * | 7/2008 | Verbeke et al. | ............... | 718/100 |
| 7,502,861 B1 * | 3/2009 | Protassov et al. | ............ | 709/229 |
| 7,533,141 B2 * | 5/2009 | Nadgir et al. | ................. | 709/200 |
| 7,606,868 B1 * | 10/2009 | Le et al. | ........................ | 709/211 |
| 7,774,391 B1 * | 8/2010 | Le et al. | ........................ | 707/822 |
| 8,090,797 B2 * | 1/2012 | Chinta et al. | .................. | 709/217 |
| 8,095,525 B2 * | 1/2012 | Le et al. | ........................ | 707/705 |
| 8,239,572 B1 * | 8/2012 | Brandwine et al. | ........... | 709/240 |
| 8,352,938 B2 * | 1/2013 | Hunt et al. | ........................ | 718/1 |
| 8,429,630 B2 * | 4/2013 | Nickolov et al. | ............. | 717/148 |

(Continued)

OTHER PUBLICATIONS

How the Net works: An Introduction to Peering and Transit; Rudolph van der Berg; dated Sep. 2, 2008.

(Continued)

*Primary Examiner* — Ranodhi Serrao
(74) *Attorney, Agent, or Firm* — Knobbe, Martens, Olson & Bear LLP

(57) ABSTRACT

Virtualization technologies can be adapted to allow a single physical computing machine to be shared among multiple virtual networks by providing one or more virtual machines simulated in software by the single physical computing machine, with each virtual machine acting as a distinct logical computing system. Virtual network instances with overlapping network addresses can be supported on the same computing system, allowing users to specify the virtual network in greater detail. Techniques are described for programmatically provisioning virtual networks. Each virtual network can have its own virtual address space, allowing multiple networks to have overlapping address spaces. The virtual IP addresses or other addresses for one or more components of a virtual network could share the same address but still operate without interfering with each other.

31 Claims, 5 Drawing Sheets

(56) References Cited

U.S. PATENT DOCUMENTS

| | | | |
|---|---|---|---|
| 2004/0088646 A1* | 5/2004 | Yeager et al. | 715/500 |
| 2004/0098447 A1* | 5/2004 | Verbeke et al. | 709/201 |
| 2004/0148326 A1* | 7/2004 | Nadgir et al. | 709/200 |
| 2005/0268298 A1* | 12/2005 | Hunt et al. | 718/1 |
| 2007/0239987 A1* | 10/2007 | Hoole et al. | 713/169 |
| 2007/0266433 A1* | 11/2007 | Moore | 726/15 |
| 2009/0276771 A1* | 11/2009 | Nickolov et al. | 717/177 |
| 2010/0146504 A1* | 6/2010 | Tang | 718/1 |
| 2010/0281102 A1* | 11/2010 | Chinta et al. | 709/203 |
| 2011/0047195 A1* | 2/2011 | Le et al. | 707/827 |
| 2011/0141124 A1* | 6/2011 | Halls et al. | 345/522 |
| 2011/0145418 A1* | 6/2011 | Pratt et al. | 709/227 |
| 2011/0145458 A1* | 6/2011 | Narasimhan | 710/260 |
| 2011/0145820 A1* | 6/2011 | Pratt et al. | 718/1 |
| 2011/0145821 A1* | 6/2011 | Philipson et al. | 718/1 |
| 2011/0145916 A1* | 6/2011 | McKenzie et al. | 726/19 |
| 2011/0276661 A1* | 11/2011 | Gujarathi et al. | 709/219 |
| 2012/0184242 A1* | 7/2012 | Li et al. | 455/406 |

OTHER PUBLICATIONS

VL2: A Scalable and Flexible Data Center Network; Albert Greenberg, et al.; dated Aug. 2009.

Cisco Policy Based Routing White Paper; accessed Jun. 7, 2010.

Internet Security Systems, Distributed Denial of Service Attack Tools; accessed Jun. 7, 2010.

B. Pfaff, et al., Extending Networking into the Virtualization Layer, Proceedings of the $8^{th}$ ACM Workshop on Hot Topics in Networks (HotNets- VIII), New York City, New York (Oct. 2009).

A. Greenberg, et al., Towards a Next Generation Data Center Architecture: Scalability and Commoditization, dated Aug. 22, 2008.

J. E. Smith, et al., Virtual Machines: Architectures, Implementations and Applications, HOTCIPS 17, Tutorial 1, Part 2, dated Aug. 14, 2005.

P. Barham, et al., Xen and the Art of Virtualization, SOSP'03, Oct. 19-22, 2003.

* cited by examiner

PROGRAMATICALLY PROVISIONING VIRTUAL NETWORKS

BACKGROUND

With the introduction of virtualization technology, a computing service provider can now provide computing resources to customers dynamically or in a scalable manner. As the computing resource demands of the customer increase, the computing service provider can allocate additional computing resources. Such resources can be provided to the customer as part of a virtual network connectable to the customer's own physical network. These computing resources can be provided to a customer transparently, without the customer's knowledge of where on an associated physical network such a resource exists. However, these computing resources may be represented to the customer as virtual network components, such that the customer has the illusion of having sole access to the computing resource.

Generally, computer resources are designated using various addresses. An address space defines a range of discrete addresses, which may correspond to a physical or virtual memory, a network host, peripheral device, disk sector, or other logical or physical entity. For example, memory addresses are used to determine where to load or store information. Meanwhile, networking addresses are used to determine where to route packet information. Such address spaces may be used in both physical and virtual networks.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

With the advent of virtualization technologies, networks and routing for those networks can now be simulated using commodity hardware. For example, virtualization technologies such as those provided by VMware, XEN, or User-Mode Linux can be adapted to allow a single physical computing machine to be shared among multiple virtual networks by providing one or more virtual machines simulated in software by the single physical computing machine, with each virtual machine acting as a distinct logical computing system. In addition, as routing can be accomplished through software, additional network setup flexibility can be provided to the virtual network in comparison with hardware-based routing. In some implementations, virtual network instances with overlapping network addresses can be supported on the same computing system, allowing users to specify the virtual network in greater detail.

In this disclosure, techniques are described for programmatically provisioning virtual networks. In some embodiments, each virtual network has its own virtual address space, allowing multiple networks to have overlapping address spaces. In one embodiment, the virtual network can be provisioned as a unit, thereby simplifying the design, implementation, maintenance or deployment of distributed, networked applications. In one embodiment, the virtual Internet Protocol addresses (IP addresses) or other addresses for one or more components of a virtual network are specified. For example, two virtual networks could both use the 192.168.1.X IP address space while co-existing in the same virtual network provisioning system without traffic collisions. Components in the two virtual networks could share the same address but still operate without interfering with each other.

In some embodiments, virtual network instances can be instantiated as a unit or group of components for operating an application, such as a distributed, networked application. A user may provide network configuration data, such as network addresses, software module selections, desired performance characteristics, or the like, to a provisioning system and the provisioning system may instantiate one or more virtual network instances based on the network configuration data.

In some embodiments, multiple users or entities (e.g. businesses or other organizations) can access the system as tenants of the system, each having their own virtual network in the system. Different entities may request different networking topologies, which can coexist on the same physical network, even if the virtual network instances have overlapping addressing.

Figure 1:
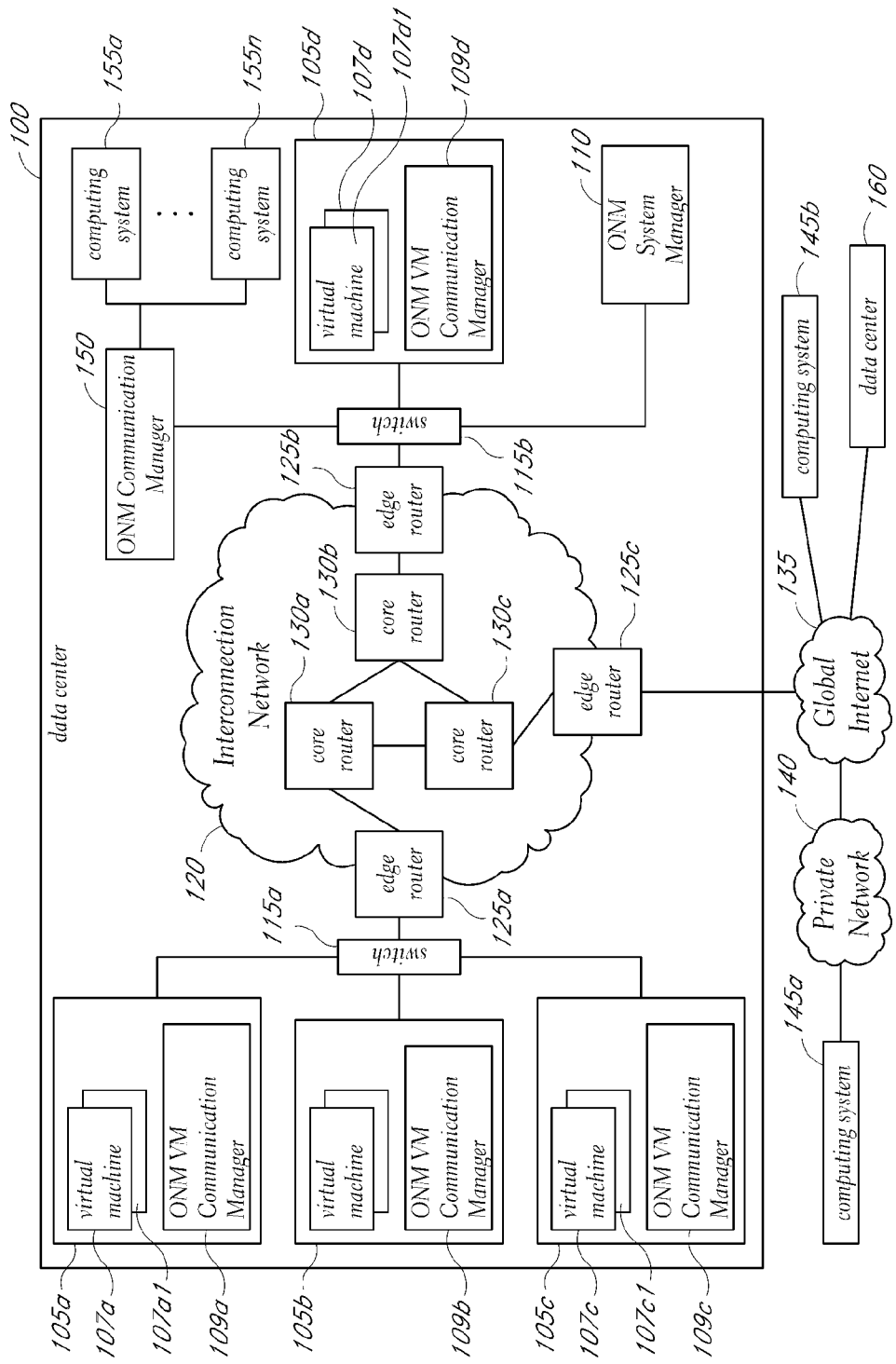
FIG. 1 is a network diagram illustrating an embodiment of an overlay network manager (ONM) system for managing computing nodes associated with a virtual computer network.

By way of overview, FIG. 1 illustrates an embodiment where communications between multiple computing nodes of the virtual computer network emulate functionality that would be provided by logical networking devices if they were physically present. In some embodiments, some or all of the emulation are performed by an overlay network manager system. FIGS. 2-5 discuss embodiments of virtual network provisioning systems supporting programmatic provisioning.

Overlay Network Manager

FIG. 1 is a network diagram illustrating an embodiment of an overlay network manager (ONM) system for managing computing nodes associated with a virtual computer network. Virtual network communications can be overlaid on one or more intermediate physical networks in a manner transparent to the computing nodes. In this example, the ONM system includes a system manager module 110 and multiple communication manager modules 109*a*, 109*b*, 109*c*, 109*d*, and an ONM Communication Manager 150 to facilitate the configuring and managing communications on the virtual computer network.

The illustrated example includes an example data center 100 with multiple physical computing systems operated on behalf of the ONM system. The example data center 100 is connected to a global internet 135 external to the data center 100. The global internet can provide access to one or more computing systems 145*a* via private network 140, to one or more other globally accessible data centers 160 that each have multiple computing systems, and to one or more other computing systems 145*b*. The global internet 135 can be a publicly accessible network of networks, such as the Internet, and the private network 140 can be an organization's network that is wholly or partially inaccessible from computing systems external to the private network 140. Computing systems 145*b* can be home computing systems or mobile computing devices that each connects directly to the global internet 135

(e.g., via a telephone line, cable modem, a Digital Subscriber Line ("DSL"), cellular network or other wireless connection, etc.).

The example data center 100 includes a number of physical computing systems 105a-105d and 155a-155n, as well as a Communication Manager module 150 that executes on one or more other computing systems to manage communications for the associated computing systems 155a-155n. The example data center further includes a System Manager module 110 that executes on one or more computing systems. In this example, each physical computing system 105a-105d hosts multiple virtual machine computing nodes and includes an associated virtual machine ("VM") communication manager module (e.g., as part of a virtual machine hypervisor monitor for the physical computing system). Such VM communications manager modules and VM computing nodes include VM Communication Manager module 109a and virtual machines 107a on host computing system 105a, and VM Communication Manager module 109d and virtual machines 107d on host computing system 105d. Physical computing systems 155a-155n do not execute any virtual machines in this example, and thus can each act as a computing node that directly executes one or more software programs on behalf of a user. The Communication Manager module 150 that manages communications for the associated computing systems 155a-155n can have various forms, such as, for example, a proxy computing device, firewall device, or networking device (e.g., a switch, router, hub, etc.) through which communications to and from the physical computing systems travel. In other embodiments, all or none of the physical computing systems at the data center host virtual machines.

This example data center 100 further includes multiple physical networking devices, such as switches 115a-115b, edge router devices 125a-125c, and core router devices 130a-130c. Switch 115a is part of a physical sub-network that includes physical computing systems 105a-105c, and is connected to edge router 125a. Switch 115b is part of a distinct physical sub-network that includes physical computing systems 105d and 155a-155n, as well as the computing systems providing the Communication Manager module 150 and the System Manager module 110, and is connected to edge router 125b. The physical sub-networks established by switches 115a-115b, in turn, are connected to each other and other networks (e.g., the global internet 135) via an intermediate interconnection network 120, which includes the edge routers 125a-125c and the core routers 130a-130c. The edge routers 125a-125c provide gateways between two or more sub-networks or networks. For example, edge router 125a provides a gateway between the physical sub-network established by switch 115a and the interconnection network 120, while edge router 125c provides a gateway between the interconnection network 120 and global internet 135. The core routers 130a-130c manage communications within the interconnection network 120, such as by routing or otherwise forwarding packets or other data transmissions as appropriate based on characteristics of such data transmissions (e.g., header information including source or destination addresses, protocol identifiers, etc.) or the characteristics of the interconnection network 120 itself (e.g., routes based on the physical network topology, etc.).

The System Manager module 110, Communication Manager modules 109 and ONM Communication Manager 150 can configure, authorize, and otherwise manage communications between associated computing nodes, including providing logical networking functionality for one or more virtual computer networks that are provided using the computing nodes. For example, Communication Manager module 109a and 109c manages associated virtual machine computing nodes 107a and 107c and each of the other Communication Manager modules can similarly manage communications for a group of one or more other associated computing nodes. The Communication Manager modules can configure communications between computing nodes so as to overlay a virtual network over one or more intermediate physical networks that are used as a substrate network, such as over the interconnection network 120.

Furthermore, a particular virtual network can optionally be extended beyond the data center 100, such as to one or more other data centers 160 which can be at geographical locations distinct from the first data center 100. Such data centers or other geographical locations of computing nodes can be interconnected in various manners, including via one or more public networks, via a private connection such as a direct or VPN connection, or the like. In addition, such data centers can each include one or more other Communication Manager modules that manage communications for computing systems at that data. In some embodiments, a central Communication Manager module can coordinate and manage communications among multiple data centers.

Thus, as one illustrative example, one of the virtual machine computing nodes 107a1 on computing system 105a can be part of the same virtual local computer network as one of the virtual machine computing nodes 107d1 on computing system 105d. The virtual machine 107a1 can then direct an outgoing communication to the destination virtual machine computing node 107d1, such as by specifying a virtual network address for that destination virtual machine computing node. The Communication Manager module 109a receives the outgoing communication, and in at least some embodiments determines whether to authorize the sending of the outgoing communication. By filtering unauthorized communications to computing nodes, network isolation and security of entities' virtual computer networks can be enhanced. In some embodiments, the ONM system may allow specifying the expected network interactions of virtual machines independent of a distributed application's code. This can allow network administrators to protect sensitive assets independent of the application code. For example, traffic between virtual machines operating a distributed application can be routed through security nodes designated by the ONM system that analyze, filter or sanitize the traffic, even if the application code for the distributed application does not specify that behavior or specifies a different behavior. This could eliminate the need to perform expensive code audits, or it could prevent software designers and support engineers from undergoing security clearance.

The Communication Manager module 109a can determine the actual physical network location corresponding to the destination virtual network address for the communication. For example, the Communication Manager module 109a can determine the actual destination network address by dynamically interacting with the System Manager module 110, or can have previously determined and stored that information. The Communication Manager module 109a then re-headers or otherwise modifies the outgoing communication so that it is directed to Communication Manager module 109d using an actual substrate network address.

When Communication Manager module 109d receives the communication via the interconnection network 120, it obtains the virtual destination network address for the communication (e.g., by extracting the virtual destination network address from the communication), and determines to which virtual machine computing nodes 107d the communication is directed. The Communication Manager module 109*d* then re-headers or otherwise modifies the incoming communication so that it is directed to the destination virtual machine computing node 107*d*1 using an appropriate virtual network address for the virtual computer network, such as by using the sending virtual machine computing node 107*a*1's virtual network address as the source network address and by using the destination virtual machine computing node 107*d*1's virtual network address as the destination network address. The Communication Manager module 109*d* then forwards the modified communication to the destination virtual machine computing node 107*d*1. In at least some embodiments, before forwarding the incoming communication to the destination virtual machine, the Communication Manager module 109*d* can also perform additional steps related to security.

Further, the Communication Manager modules 109*a* or 109*c* on the host computing systems 105*a* and 105*c* can perform additional actions that correspond to one or more logical specified router devices lying between computing nodes 107*a*1 and 107*c*1 in the virtual network topology. For example, the source computing node 107*a*1 can direct a packet to a logical router local to computing node 107*a*1 (e.g., by including a virtual hardware address for the logical router in the packet header), with that first logical router being expected to forward the packet to the destination node 107*c*1 via the specified logical network topology. The source Communication Manager module 109*a* receives or intercepts the packet for the logical first router device and can emulate functionality of some or all of the logical router devices in the network topology, such as by modifying a TTL ("time to live") hop value for the communication, modifying a virtual destination hardware address, or otherwise modify the communication header. Alternatively, some or all the emulation functionality can be performed by the destination Communication Manager module 109*c* after it receives the packet.

By providing logical networking functionality, the ONM system provides various benefits. For example, because the various Communication Manager modules manage the overlay virtual network and can emulate the functionality of logical networking devices, in certain embodiments specified networking devices do not need to be physically implemented to provide virtual computer networks, allowing greater flexibility in the design of virtual user networks. Additionally, corresponding modifications to the interconnection network 120 or switches 115*a*-115*b* are generally not needed to support particular configured network topologies. Nonetheless, a particular network topology for the virtual computer network can be transparently provided to the computing nodes and software programs of a virtual computer network.

Provisioning a Virtual Network Instance

Figure 2:
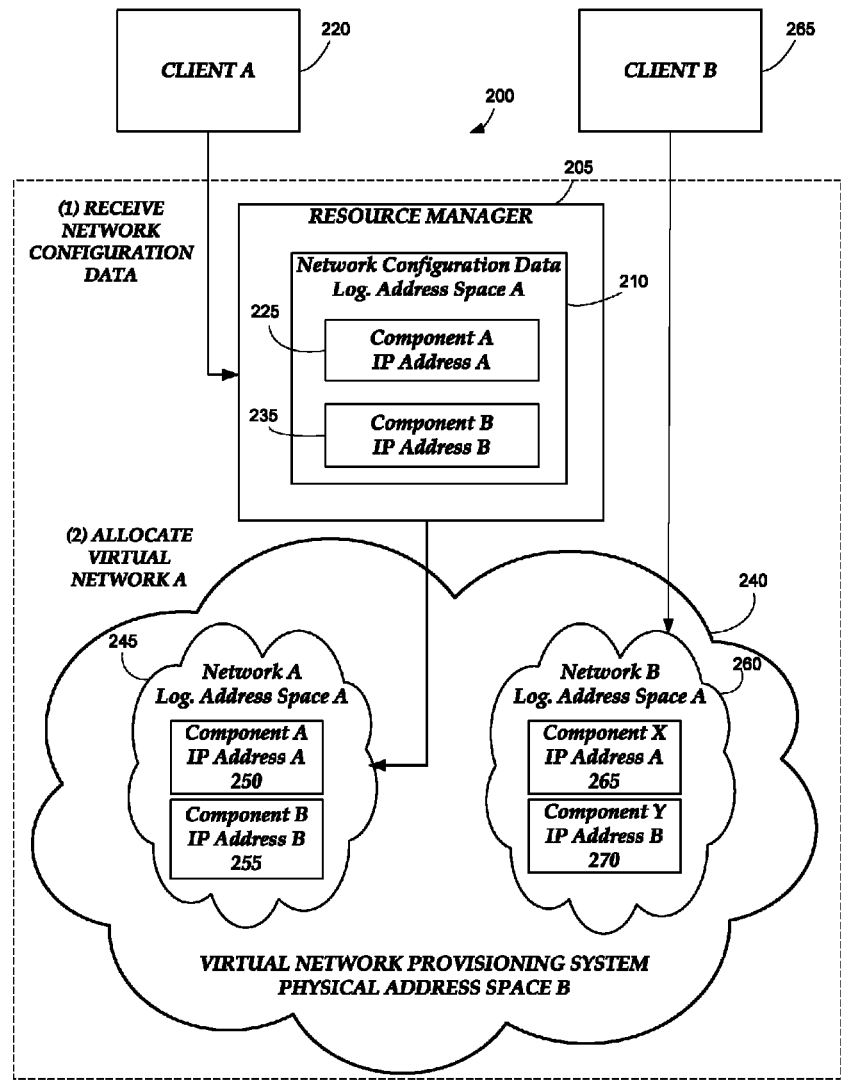
FIG. 2 illustrates an embodiment of a resource management system for allocating computing resources to a customer.

FIG. 2 illustrates an embodiment of a resource management system 200 for allocating computing resources to a customer. In one embodiment, a computing resources provider operates the resource management system 200 for dynamically provisioning customers or clients with computing resources. The resource management system can include a resource manager 205. The resource manager can receive network configuration data 210 for a virtual network from a client 220 requesting a computing resource, such as memory or processing resources.

The network configuration data can include information on network topology, logical address space, or virtual network components 225, 235, such as interconnections between network components, characteristics of said connections, or characteristics of the network components 225, 235, such as IP addresses or other network addresses. For example, the network configuration data can include maximum number of connections, workload thresholds, or performance characteristics of connections, such as bandwidth or latency. In another example, the network configuration data can include network component characteristics such as processing speeds or memory resources. In one embodiment, the network configuration includes logical address space data, such as, for example, IP addresses, MAC addresses, or addresses for memory, virtual machines, or other entities. Different virtual networks may have overlapping logical address spaces. In one embodiment, the network configuration data 210 can be stored in a network configuration template (NCTs). NCTs can allow implementation details of the virtual network to be abstracted away from the user, thereby allowing a user to instantiate an instance or multiple instances of the application or multiple applications by selecting an NCT for the application. Multiple instances may be instantiated at once or individually at different times, such as when additional capacity is desired or needed, or when testing or upgrading applications.

In one embodiment, the network configuration data contains the deployment information for an application, such as a distributed, networked application. For example, the network configuration data for a storefront application can include configuration data for virtual network components such as a web server, a load balancer, or a database. Other applications can include storage applications, simulation applications, scientific calculation applications, modeling applications, or the like.

Virtual network components 225, 235 can include computing nodes, routers, switches, servers, databases, storage, load balancers or other computing devices. Operation of the virtual network components can be simulated on virtual machines operating on physical computing nodes of a computing system.

The resource manager 205 can include a data interface, such as a web page or application, for receiving data from the customer. The resource manager 205 can be implemented on a computing system with one or more computing devices. The resource manager 205 can be part of or in communication with provisioning systems 240 of a computing resources provider, such as an ONM system or data center 100. In one embodiment, the resource management system 200 is associated with a single data center. In another embodiment, the resource management system 200 allocates resources for several data centers. In some embodiments, one or more data centers may be grouped into independent availability zones, where each availability zone can be expected to remain operating regardless of the status of other availability zones.

Customers or clients of the computing resources provider can be individuals, businesses, groups, or other entities desiring virtual computing resources. A client 220, for example, a large business or research institution, can have users that include both network administrators (including security administrators) and standard (e.g., non-administrative) users. The client 220 can comprise the physical network on which users operate, such as an office, university, or private network.

The resource manager 205 can store network configuration data for a plurality of customers, for example, using NCTs. In one embodiment, a NCT is an entry or entries in a lookup table or database. In one embodiment, the NCT is a data file, such as an XML file, text file, or the like. In one embodiment, the NCT can contain executable code. For example, the NCT can include code for creating a new virtual network, a subnet in a virtual network or for otherwise modifying the virtual network.

In one embodiment, the resource manager 205 allocates computing resources to the virtual network or to components of the virtual network. Computing resources can simulate virtual network components, thereby providing the capabilities of the computing resource to the virtual network. In one embodiment, the resource manager 205 communicates provisioning instructions to a virtual network provisioning system 240, such as the ONM system of FIG. 1, in order to instantiate one or more network instances. The instances can be instantiated on different computing resources, partially on the same resources, or on the same computing resources.

In one embodiment, the network configuration data 210 can comprise data for an entire virtual network or on portions of the virtual network, such as a subnet. In one embodiment, the network configuration data 210 is stored in a database, file, or other storage medium. When a client 220 requests the allocation of resources from the resource management system 200, the client 220 can provide or specify the network configuration data, for example, through a drop down menu or other field on a user interface provided by a web site, an application, or a file, such as a NCT.

In one embodiment, the resource manager 205 instantiates an instance 245 of the virtual network based on the network configuration data. For example, the virtual network instance 245 includes network components 250, 255 specified by the network configuration data 210 with logical address space (e.g. IP addresses) matching the logical address space specified by the network configuration data 210.

In one embodiment, the logical address space for Network A 245 may overlap with other virtual networks. For example, FIG. 2 illustrates Network B 260 on the same virtual network provisioning system 240 sharing the same address space. Client B 265 is in communication with Network B 260, but the communications do not interfere with communications between Client A and Network A even though the address spaces used by the virtual networks overlap. In one embodiment, where two or more virtual networks share logical address spaces, one virtual network (e.g. Network B 260) may be directly addressable from outside networks (e.g. Client B 265) while the other virtual networks with overlapping address spaces are accessed through a redirection/translation service.

The logical address spaces used by the virtual networks may or may not overlap with the physical address space used by the provisioning system 240. The provisioning system 240 can comprise the ONM system of FIG. 1 and provide communications between virtual networks, for example, through translations between logical and physical addresses.

Allowing overlapping address spaces provides several possible advantages. One possible advantage is that it can allow provisioning of larger virtual networks or greater numbers of virtual networks by reducing or removing the problem of address space exhaustion. For example, allowing overlapping IP addresses in different virtual networks increases the number of assignable addresses.

Another possible advantage is that clients can specify the address space. Typically, address space allocation is handled by provisioning systems in order to prevent collisions. For example, Dynamic Host Configuration Protocol (DHCP) is an autoconfiguration protocol for automatically assigning and managing IP address assignments. However, if overlapping address spaces are allowed, then clients can be provided the option to specify the address spaces. This can simplify the operation or the implementation of client systems as the clients know the characteristics of the virtual network beforehand and can plan accordingly. For example, the client can specify IP addresses rather than wait to receive an assigned IP address.

Another possible advantage is allowing substituting of network instances, for example, by or swapping in or out instances. By including networking address information for the components of the virtual network, a new instance of the virtual network can be instantiated and used to replace the original instance. The original instance can be swapped out and the new instance swapped in. Swapping in and out can occur with operating or suspended instances (e.g. hot swapping or cold swapping). In one embodiment, the new instance and old instance are instantiated based on the network configuration data, and both instances share the same logical addresses for their virtual network components. For example, if the Network A instance 245 crashes or comes down for maintenance, the resource manager 205 can instantiate another functionally identical instance with the same address space to replace the functionality of Network A. Thus, the old instance can be replaced by the new instance transparently to outside networks (e.g. virtual or physical). To the outside networks, communications to the virtual network are addressed to the same network addresses, thus the changes are not apparent to the outside networks. Meanwhile, the Network A instance can be preserved for system maintenance or for testing or debugging purposes so that problems may be identified. In order to further explain embodiments of the operation of the resource management system 200, an example scenario is discussed below with respect to FIG. 3.

Figure 3:
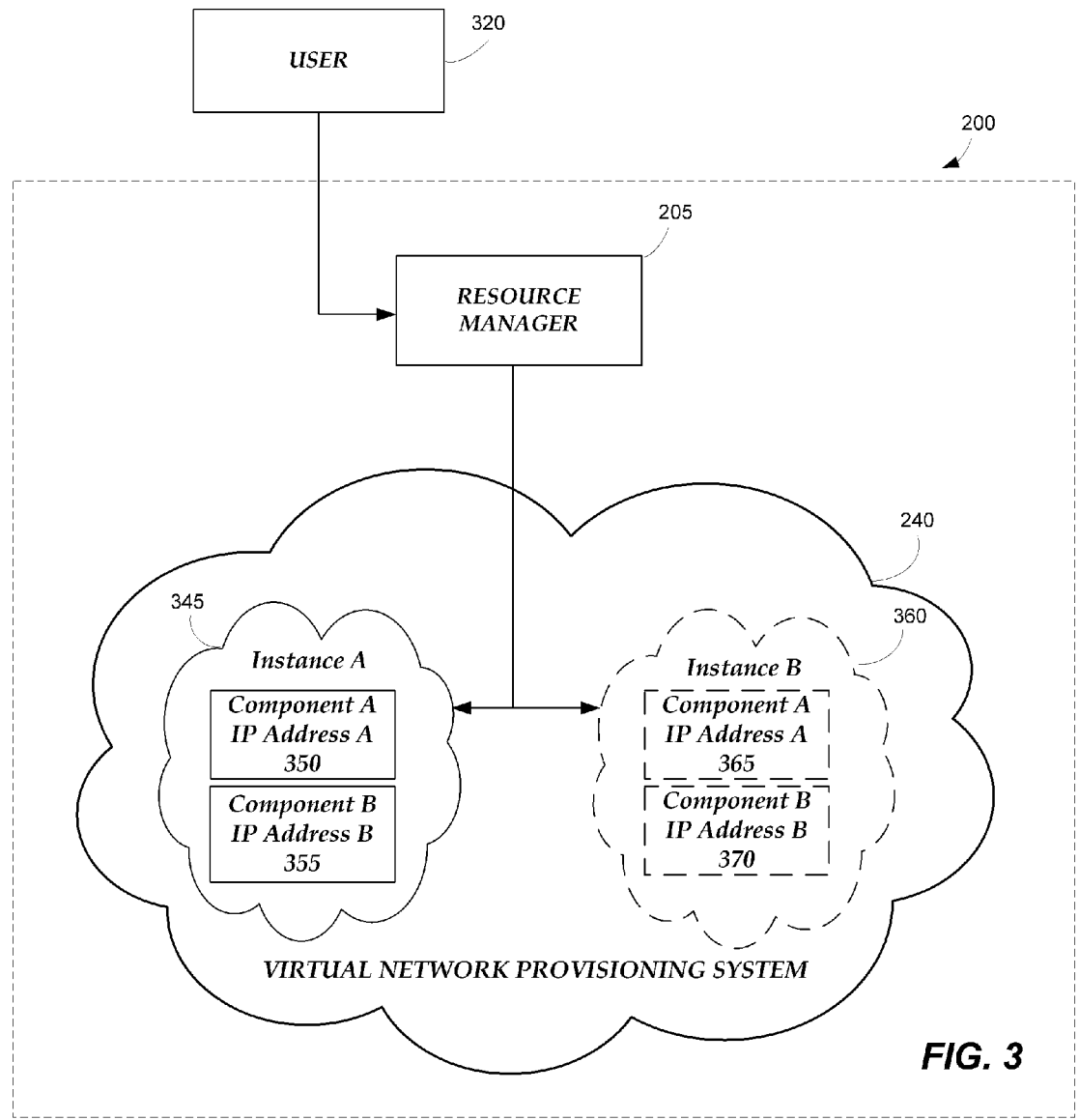
FIG. 3 illustrates an example scenario of resource allocation for an embodiment of the resource management system.

FIG. 3 illustrates an example scenario of resource allocation for an embodiment of the resource management system 200. In FIG. 3, Instance A 345 of the virtual network is actively operating and receives a work request from one or more users 320. These requests can include web page requests, database queries, web searches, simulations, operation of applications, or other request using computational or memory resources. Instance A 345 then performs the requested operation.

However, the resource manager 205 may receive instructions to switch out instances or may determine that an instance needs to be or switched out, for example, due to a crash, maintenance, or due to overloading. The resource manager 205 then instantiates a new Instance B 360 that is functionally equivalent to instance A 345 and sharing the same address space. Instance B then takes over servicing work requests for Instance A. As will be apparent, the resource manager can instantiate any number of instances. For example, multiple virtual network instances can be instantiated to handle a spike in work requests, with the number of instances generated based on the workload.

In one embodiment, the resource manager 205 or another entity provides redirection or translation services. User 320 work requests are routed through the resource manager 205, which then determines where the work request is performed. For example, a work request is addressed to Component A 350, 365 at IP address A. The resource manager 205 determines whether to send it to Instance A or redirect the request to Instance B. The resource manager 205 may use network address translation (NAT) or packet mangling to redirect communications. For example, the resource manager 205 can determine the source of communication packets and based on that determination, redirect the communication packets to the virtual network associated with the source. In some embodiments, the resource manager 205 comprises the ONM system of FIG. 1 or portions of the system, such as the ONM Communication Manager 150 or ONM System Manager 110.

In one embodiment, only one virtual network instance is active at a time and redirection may be unnecessary. For example, if Instance A 345 becomes inactive once switched out, then work requests can be automatically routed to Instance B 360. In one embodiment, one instance of the virtual network may be directly reachable from outside networks while the other instances of the network are reachable via address translation or redirection.

Figure 4:
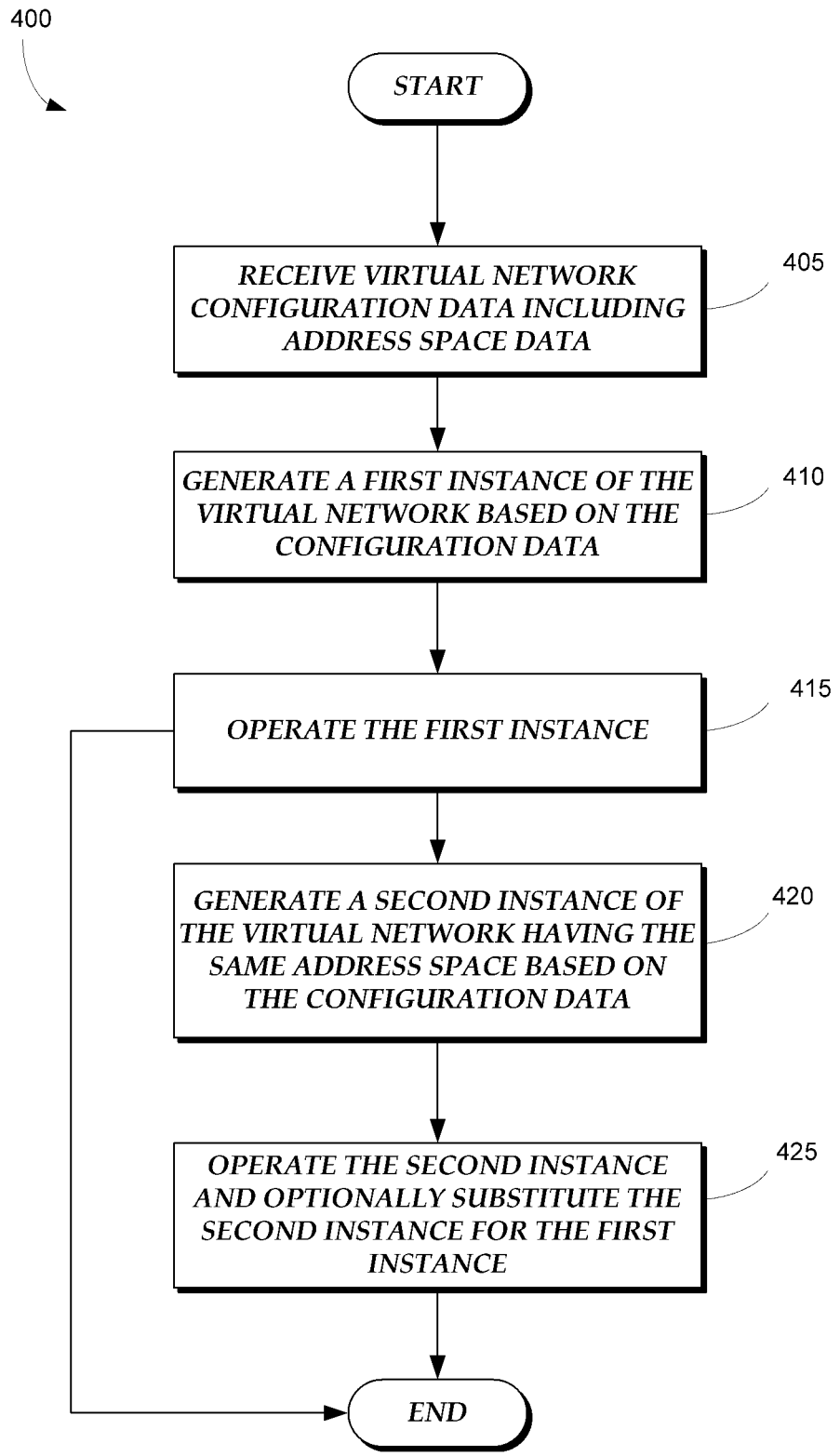
FIG. 4 illustrates a flow diagram for an embodiment of a process 400 of provisioning computing resources based on network configuration data.

FIG. 4 illustrates a flow diagram for a process 400 of provisioning computing resources based on network configuration data 210 usable in the example systems described above. For ease of explanation, the process will be described herein as performed by the resource management system 200; however, the process may be performed wholly or partially by any other suitable computing device or system, such as by ONM system of FIG. 1 or by components of that system. In addition, the process may be performed by any user. For example, the administrator may perform the actions of the standard user. Furthermore, while the following disclosure discusses a first and second virtual network instances, the process can be applied using any number of virtual network instances.

Beginning at block 405, the resource management system 200 receives virtual network configuration data 210. The configuration data can include information on network topology, logical address space, or network components, such as interconnections between network components, characteristics of said connections, or characteristics of the network components. In one embodiment, the network configuration data 210 specifies the address space for the virtual network. The network configuration data 210 can be determined by a client. For example, a client can specify the virtual network components, characteristics of the virtual network, as well as addresses of the components. In one embodiment, the resource management system 200 receives the network configuration data 210 in a network configuration template.

In one embodiment, the network topology data comprises a network layout, for example, generated by a design program such as VISIO. The resource management system 200 can use the network layout to generate a topology for a virtual network composed of one or more virtual subnets. In some embodiments, the network topology comprises a network layout, traffic rules for the network, bandwidth for nodes or links, latency, or other characteristics of the network topology. The topology of the virtual network can be used to determine, at least partly, the access constraints for portions of the network. For example, if two subnets are not connected, then traffic from one subnet cannot reach the other.

At block 410, the resource management system 200 generates a first instance of the virtual network based on the configuration data 210. In one embodiment, the network configuration data 210 comprises data sufficient to define an entire virtual network. For example, the configuration data 210 can define address spaces, such as networking address, network topology, component placement, or network component makeup. In some situations, there may be pre-existing virtual network instances on the resource management system 200 for the virtual network or for other virtual networks. In this case, physical computing resources of the resources management system 200 may be shared between multiple virtual networks and multiple users and clients.

In one embodiment, the resource management system 200 allows overlapping address spaces, such as networking addresses, between instances. The resource management system handles direction of communications. In another embodiment, address spaces are not shared.

At block 415, the resource management system 200 operates or simulates the first network instance. The active first network instance can then receive and process work requests from users. In one embodiment, the work request is routed to the first network instance by the resource management system 200, for example, by the resource manager 205. In some implementations the process ends after block 415. However, in other implementations, the process proceeds to block 420.

At block 420, the resource management system 200 generates a second instance of the virtual network based on the configuration data 210. In one embodiment, the second instance of the virtual network is functionally equivalent to the first instance or utilizes the same address space. In one embodiment, the first instance and the second instance have corresponding virtual network components having identical network addresses.

At block 425, the resource management system 200 system operates or simulates the second instance and may optionally substitute the second instance for the first instance. In some embodiments, at least some work requests are processed by the second instance in place of the first instance. In one embodiment, the first instance is suspended and the second instance becomes active and handles new work requests addressed to the first instance. In one embodiment, work requests being performed by the first instance immediately before suspension are transferred to the second instance. For example, the resource management system 200 can track work requests and resubmit incomplete work requests to the second instance.

In one embodiment, a newer application version may be deployed on the second instance and upgrading to the new version is accomplished by directing work requests to the second instance. By using a second virtual network instance for upgrading, setup and configuration of the application version can be accomplished without having to shut down or otherwise impair operation of the active virtual network instance. Thus, users can be transitioned transparently to the new application version. In one embodiment, the deployment may happen gradually, with work requests being gradually transitioned to the new virtual network instance (e.g., using a random weighting process or other selection process to progressively increase work requests to the new instance). This can allow the new application version to be tested, evaluated, or modified, while keeping the old application version available to respond to requests, if needed. Additionally, as will be explained below in greater detail below, the first and second instances may be operated in parallel or in conjunction.

In one embodiment, the second instance is operated as a backup or to take on overflow work requests. For example, if the first instance reaches its capacity limit, passes an associated workload threshold (e.g., number of connections, number of users, level of CPU usage, level of memory usage, or the like), further work requests can be directed to one or more backup instances (e.g. the second instance). If the second instance utilizes the same address space as the first instance, then the switch can be transparent to the user. In other embodiments, the first instance may become the backup instance while the second instance becomes the primary instance. In one embodiment, the first and second instance, as well as possibly other additional instances, operate concurrently with each other.

Illustratively, the resource management system 200 can manage the primary and secondary backup instances by metering requests. For example, the resource management system 200 can send the request to the backup if the original did not respond within a timeout period (e.g., milliseconds, seconds, or any other time period). This can enable strong guarantees of low-level connectivity between two or more networked applications, which can be stronger than the guarantee of the network. In another example, the resource management system 200 may automatically "spill-over" work requests to another instance once the associated workload threshold is met or exceeded for the primary instance. In a further example, the resource management system 200 can track workload across multiple instances (e.g., primary, first backup, second backup, or other possible request destinations), allowing the resource management system 200 to load balance, or otherwise distribute, requests based on the current performance/load of the multiple instances.

In one embodiment, the resource management system 200 may copy, transmit or duplicate work requests to multiple instances, thereby allowing parallel processing of work requests. This can be beneficial where different versions or configurations of applications are being tested or compared. Further, the parallel processing of instances can allow testing using live data, providing a more authentic testing environment. In some embodiments, the resource management system 200 may evaluate the output for the work requests from the multiple instances in order to determine the performance or accuracy of the applications associated with each of the multiple instances. For example, the resource management system 200 can check whether a new application version provides the same answer, is faster or slower, or fixes an error or bug compared to the original application version. In some embodiments, only selected requests (e.g., certain types of requests, requests from a particular entity or user, or requests matching selection criteria) may be redirected or copied to another virtual network instance. Still further, portions of the work requests may be processed in parallel to generate a cumulative result.

In one embodiment, the resource management system 200 may track or record selected work requests, such as failed requests. This can allow failed requests to be resubmitted to the same or to another virtual network instance. For example, an administrator can re-run a failed work request at a later time, in order to troubleshoot or determine why a particular work request failed. In another example, the work requests may have failed because of capacity constraints, and resubmitting the requests later allows the work requests to be successfully completed. After block 425, the process can end.

Figure 5:
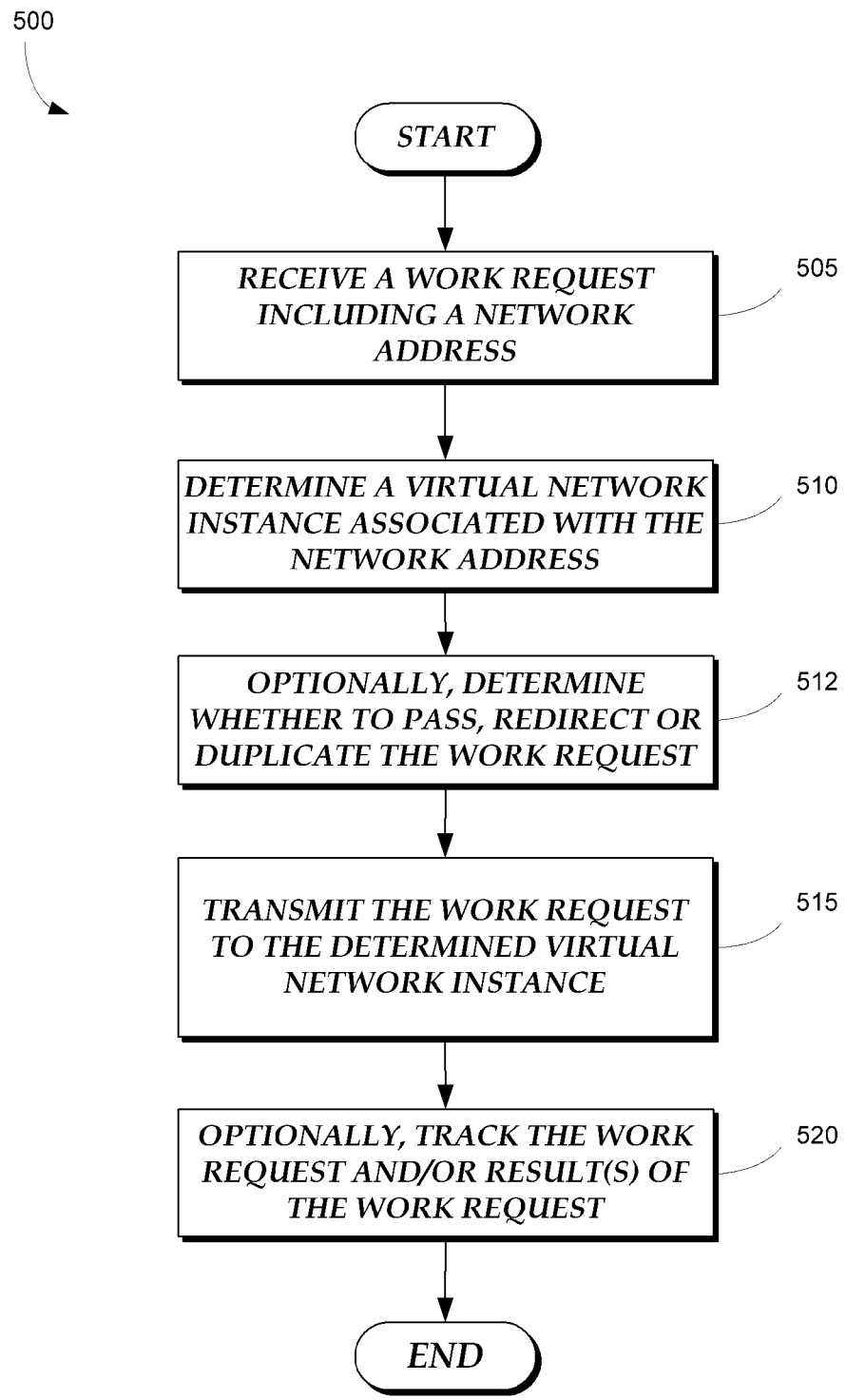
FIG. 5 illustrates a flow diagram for an embodiment of a work request redirection process.

FIG. 5 illustrates a flow-diagram for an embodiment of a work request redirection process. For ease of explanation, the method will be described herein as performed by the resource management system 200; however, the method may be performed wholly or partially by any other suitable computing device or system, such as by ONM system of FIG. 1 or by components of that system.

Beginning at block 505, the resource management system 200 receives a work request from a client or user associated with that client. The work request can include web page requests, database queries, web searches, simulations, operation of applications, or other request using computational or memory resources. The work request includes network address information, such as an IP address, for the destination virtual network component.

At block 510, the resource management system 200 determines a virtual network instance associated with the network address. Because address spaces may be shared between virtual network instances, the resource management system 200 can determine to which instance to direct the work request. For example, the resource management system 200 can track networking addresses associated with a client and use that data to select the virtual network instance associated to the client. In another example, packets or the work request itself may be tagged with a work request identifier, such as a client or source identifier so that the resource management system 200 can determine the associated network instance.

At block 512, the resource management system 200 can optionally determine whether to pass, redirect or duplicate the work request. For example, if debugging or developing a virtual network instance or application associated with that instance, then work requests may be duplicated to a production virtual network instance and to a testing virtual network instance. In another example, work requests may be redirected to another virtual network instance in order to load balance work across instances. Work requests may also be redirected where a new application is being deployed on a new virtual network instance. In some situations, the work request may be allowed to pass through unmodified, such as where only a single instance of the virtual network exists or where redirection or duplication is not otherwise needed.

At block 515, the resource management system 200 transmits the work request to the determined virtual network instance. In some embodiments, the resource management system 200 may utilize NAT or packet mangling to direct the work request to the virtual network instance.

At block 520, the resource management system 200 may optionally track or store the work request or the results of the work request. In one embodiment, resource management system 200 tracks failed requests and re-runs the requests. In one embodiment, the failed requests may be used to resolve problems or bugs with the virtual machine instances, for example, during quality assurance testing. In one embodiment, the results may be tracked to compare the performance or accuracy of multiple virtual machine instances, for example, such as when testing two or more different application versions.

While embodiments of the disclosure have been described in terms of virtual subnets, it will be apparent that, in some embodiments, other virtual network locations can be used, such as portions of the virtual network associated with a particular data center, availability zone or other geographical area, user, customer or department or other network component groupings. Portions of the virtual network may be grouped into locations using various criteria and are not necessarily limited to subnetworks. In some embodiments, locations may span over multiple virtual networks.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method for provisioning a virtual network, the method comprising:
   receiving network configuration data for a virtual network, the network configuration data including network address data for one or more network components of the virtual network;
   generating, with one or more processors, a first instance of the virtual network based on the network configuration data, the first instance comprising one or more virtual network components associated with the network address data;
   operating the first instance of the virtual network on a computing system;
   determining that a workload of the first instance exceeded a workload threshold;
   based at least in part on the determination, generating, with one or more processors, a second instance of the virtual network, wherein the second instance is configured based, at least in part, on the network configuration data, the second instance comprising one or more virtual network components associated with the network address data; and
   directing work requests for the virtual network to one or more of the first instance and the at second instance of the virtual network;
   wherein the network addresses of the one or more virtual network components of the first instance are identical to the network addresses of the one or more virtual network components of the second instance.

2. The method of claim 1, wherein the computing system comprises a virtual network provisioning system.

3. The method of claim 1, wherein operating the first instance comprises:
   receiving a work request from a user; and
   performing the requested work with the first instance of the virtual network.

4. The method of claim 3, wherein the work request comprises a database operation request.

5. The method of claim 3, wherein the work request comprises a web page request.

6. The method of claim 1 further comprising:
   receiving a work request from a user during operation of the first instance of the virtual network;
   suspending the first instance of the virtual network; and
   performing the requested work with the second instance of the virtual network.

7. The method of claim 1, wherein the network address data comprise IP address data.

8. The method of claim 1, wherein the one or more virtual network components of the first instance correspond to the one or more virtual network components of the second instance.

9. A system for provisioning a virtual network, the system comprising:
   a data store comprising network configuration data for a virtual network comprising a plurality of virtual network components, the network configuration data comprising network topology data and network addresses for the plurality of virtual network components;
   a first instance of a virtual network comprising one or more virtual network components having logical network addresses operating on a physical computing system, the logical network addresses specified by the network configuration data; and
   a resource manager comprising one or more computing devices, the resource manager configured to:
      determine that a workload of the first instance exceeded a workload threshold; and
      generate at least one instance of the virtual network comprising virtual network components having the same logical network addresses as the first instance, wherein the at least one instance is generated based, at least in part, on the determination that the workload of the first instance exceeded the workload threshold, wherein the number of instances instantiated is based, at least in part, on the workload;
      direct at least some work requests having destination network addresses corresponding to the first instance for processing by the at least one instance of the virtual network.

10. The system of claim 9, wherein the resource manager is further configured to suspend operation of the first instance and direct work requests to the at least one instance instead of the first instance.

11. The system of claim 9, wherein the first instance and at least one instance are operating concurrently.

12. The system of claim 9, wherein the resource manager is further configured to determine to which virtual network instance to direct work requests.

13. The system of claim 12, wherein the resource manager determines the virtual network instance using a work request identifier.

14. The system of claim 12, wherein the resource manager determines the virtual network instance using packet information from one or more network packets comprising the work request.

15. The system of claim 12, wherein the resource manager directs a work request to the determined virtual network instance using packet mangling.

16. The system of claim 12, wherein the resource manager directs a work request to the determined virtual network instance using network address translation.

17. The system of claim 9, wherein the resource manager duplicates one or more work requests to the first instance and the at least one instance.

18. The system of claim 17, wherein the resource manager evaluates the first instance and the at least one instance based on their performance in processing the one or more duplicated work requests.

19. The system of claim 9, wherein the resource manager is further configured to:
 track one or more works requests that initially failed when performed by a virtual network instance; and
 transmit the one or more failed work requests to another virtual network instance.

20. A computer-implemented method for provisioning a virtual network, the computer-implemented method comprising:
 receiving network configuration data for a virtual network comprising a plurality of virtual network components, the network configuration data comprising network topology data and network addresses for the plurality of virtual network components;
 instantiating, with one or more processors, a first instance of the virtual network on a virtual network provisioning system comprising the plurality of virtual network components having the network addresses specified by the network configuration data;
 determining that a workload of the first instance exceeded a workload threshold;
 based, at least in part, on the determination, instantiating, with one or more processors, at least one instance of the virtual network on the virtual network provisioning system, each of the at least one instances comprising the plurality of virtual network components having the network addresses specified by the network configuration data, wherein the number of instances instantiated is based, at least in part, on the workload; and
 directing work requests for the virtual network to one or more of the first instance and the at least one instance of the virtual network.

21. The method of claim 20, wherein the multiple instances are operating concurrently.

22. The method of claim 20, wherein the multiple instances are instantiated at different times.

23. The method of claim 20, wherein one or more of the multiple instances are inactive.

24. The method of claim 20, wherein the multiple instances are operating more than one version of an application.

25. The method of claim 20, wherein directing work request comprises using a selection process enabling progressively increasing work requests to newly generated virtual network instances.

26. The method of claim 20, wherein the network topology data and network addresses are specified by a user.

27. A non-transitory computer-readable storage medium having stored thereon instructions that, when executed, direct a computing system to perform a method of computing resource allocation, the method comprising:
 generating, with one or more processors, a first virtual network instance based on network configuration data from a first user, the network configuration data comprising user-specified first network component selections and user-specified first network addresses for said first network components, the first virtual network instance operating on a computing system;
 determining that a workload of the first instance satisfied a workload threshold;
 based at least in part on the determination, generating, with one or more processors, a second virtual network instance, wherein the second virtual network instance is configured based, at least in part, on the network configuration data from a second user, the network configuration data comprising user-specified second network component selections and user-specified second network addresses for said second network components, the second virtual network instance operating on the computing system; and
 directing work requests to one or more of the first virtual network instance and the at second virtual network instance;
 wherein network components of the first virtual network instance and the second virtual network instance share the same network address.

28. The computer-readable storage medium of claim 27, further comprising determining whether to route a packet addressed for the shared network address to the first network component or the second network component.

29. The computer-readable storage medium of claim 27, wherein the network address is an IP address.

30. The computer-readable storage medium of claim 27, wherein the computing system is a data center.

31. The computer-readable storage medium of claim 27, wherein the first virtual network instance is associated with a first network identifier and the second virtual network instance is associated with a second network identifier.

* * * * *